(12) United States Patent
Knittel et al.

(10) Patent No.: US 8,259,558 B2
(45) Date of Patent: Sep. 4, 2012

(54) OPTICAL STORAGE MEDIUM AND APPARATUS FOR READING OF RESPECTIVE DATA

(75) Inventors: Joachim Knittel, Tullingen (DE); Stephan Knappmann, Zimmern Ob Rottweil (DE)

(73) Assignee: Thomson Licensing, Boulogne, Billancourt (FR)

( * ) Notice: Subject to any disclaimer, the term of this patent is extended or adjusted under 35 U.S.C. 154(b) by 334 days.

(21) Appl. No.: 12/034,909

(22) Filed: Feb. 21, 2008

(65) Prior Publication Data
US 2009/0028040 A1  Jan. 29, 2009

(30) Foreign Application Priority Data
Mar. 8, 2007  (EP) ..................................... 07103729

(51) Int. Cl.
*G11B 7/00*  (2006.01)
(52) U.S. Cl. ....................................... 369/275.4; 369/93
(58) Field of Classification Search ............... 369/13.54, 369/15.55, 275.1–275.4, 93–98; 428/64.1, 428/64.4; 430/270.13, 320–321
See application file for complete search history.

(56) References Cited

U.S. PATENT DOCUMENTS

| | | | | |
|---|---|---|---|---|
| 5,235,583 A * | 8/1993 | Jongenelis et al. | ......... | 369/44.26 |
| 5,896,366 A * | 4/1999 | Ogawa | ....................... | 369/275.4 |
| 2004/0047252 A1 * | 3/2004 | Miyatake et al. | .......... | 369/47.12 |
| 2004/0190432 A1 * | 9/2004 | Ichihara et al. | ............. | 369/275.1 |
| 2004/0252623 A1 * | 12/2004 | Van Kesteren | ............. | 369/275.4 |
| 2004/0257968 A1 | 12/2004 | Kim et al. | | |
| 2005/0063261 A1 * | 3/2005 | Kim et al. | .................. | 369/44.26 |
| 2005/0259553 A1 * | 11/2005 | Katayama | ................. | 369/112.02 |
| 2005/0265176 A1 * | 12/2005 | Miyamoto et al. | ......... | 369/47.22 |
| 2005/0274870 A1 * | 12/2005 | Katayama | .................. | 250/201.5 |
| 2006/0013112 A1 * | 1/2006 | Meinders et al. | .......... | 369/272.1 |
| 2006/0083154 A1 * | 4/2006 | Nakatani et al. | ........... | 369/275.1 |
| 2006/0280091 A1 * | 12/2006 | Kim et al. | .................. | 369/59.18 |

FOREIGN PATENT DOCUMENTS

EP  1107238  6/2001

(Continued)

OTHER PUBLICATIONS

Search Resport dated Jul. 27, 2007.
Marx et al., "Optical Diffraction of Focused Spots and Subwavelength Structures", J. Optical Society of America, vol. 14, No. 6, Jun. 1997.

(Continued)

*Primary Examiner* — Julie Anne Watko
*Assistant Examiner* — Andrew Sasinowski
(74) *Attorney, Agent, or Firm* — Jeffrey D. Carter

(57) ABSTRACT

The optical storage medium comprises tracks with a mark/space data structure, wherein the tracks comprise alternately partitioned marks and not partitioned marks. The partitioned marks are partitioned in particular in tracking direction and are partitioned in two parts, advantageously in two equal parts. The partitions are arranged advantageously such that one track comprises not partitioned marks and a neighboring track comprises partitioned marks, for reducing the track pitch of the optical storage medium and for providing an increased data capacity. The optical storage medium is in a preferred embodiment an optical disc comprising a mask layer with a suitable material for providing a super resolution near field effect, and the data structure of the optical disc comprises two spirals which have either partitioned marks or not partitioned marks. An apparatus for reading the data of a respective optical storage medium comprises a pick-up unit with a laser and a first optical element for providing a TM polarized beam and a TE polarized beam, a second optical element for separating the reflected TM and TE polarized beams, and a first and a second detector.

10 Claims, 4 Drawing Sheets

FOREIGN PATENT DOCUMENTS

| | | |
|---|---|---|
| JP | 57058248 | 4/1982 |
| JP | 05182203 | 7/1993 |
| WO | WO03/034412 | 4/2003 |
| WO | WO2004032123 | 4/2004 |
| WO | WO2005081242 | 9/2005 |
| WO | WO2006/056947 | 6/2006 |

OTHER PUBLICATIONS

Tominaga et al., "An Approach for Recording and Readout Beyond the Diffraction Limit with an Sb Thin Fillm", Applied Physics letters, vol. 73, No. 15, Oct. 12, 1998.

Search Report dated Dec. 11, 2008.

* cited by examiner

OPTICAL STORAGE MEDIUM AND APPARATUS FOR READING OF RESPECTIVE DATA This application claims the benefit, under 35 U.S.C. §119 of EP Patent Application 07103729.5 filed 08 Mar. 2007.

TECHNICAL FIELD OF THE INVENTION

The present invention relates to an optical storage medium, in particular an optical disc comprising a super resolution near field structure for storing of data with a high data density in a read only region, and to an apparatus for reading of respective data from the storage medium.

BACKGROUND OF THE INVENTION

Optical storage media are media in which data are stored in an optically readable manner, for example by means of a pickup comprising a laser for illuminating the optical storage medium and a photo-detector for detecting the reflected light of the laser beam when reading the data. In the meanwhile a large variety of optical storage media are known, which are operated with different laser wavelength, and which have different sizes for providing storage capacities from below one Gigabyte up to 50 Gigabyte (GB). The formats include read-only formats such as Audio CD and Video DVD, write-once optical media as well as rewritable formats like CD-RW, DVD-RW, DVD+RW and DVD-RAM for example. Digital data are stored in these media along tracks in one or more layers of the media.

The storage medium with the highest data capacity is at present the Blu-Ray disc (BD), which allows to store 50 GB on a dual layer disc. Available formats are at present read-only BD-ROM, re-writable BD-RE and write once BD-R discs. For reading and writing of a Blu-Ray disc an optical pickup with a laser wavelength of 405 nm is used. On the Blu-Ray disc a track pitch of 320 nm and a mark length from 2T to 8T, maximum 9T is used, where T is the channel bit length, which corresponds with a minimum mark length of 138-160 nm. Further information about the Blu-Ray disc system is available for example from the Blu-Ray group via Internet: www.blu-raydisc.com.

New optical storage media with a super resolution near-field structure (Super-RENS) offer the possibility to increase the data density of the optical storage medium by a factor of three or four in one dimension in comparison with the Blu-Ray disc. This is possible by using a so-called Super-RENS structure or layer, which is placed above an information layer of the optical storage medium, and which significantly reduces the effective size of a light spot used for reading from or writing to the optical storage medium. The super resolution layer is also called a mask layer because it is arranged above the data layer and only the high intensity center part of a laser beam can penetrate the mask layer.

The Super-RENS effect allows to record and read data stored in marks of an optical disc, which have a size below the resolution limit of a laser beam used for reading or writing the data on the disc. As known, the diffraction limit of the resolution of the laser beam is about lambda/(2×NA), where lambda is the wavelength and NA the numerical aperture of the objective lens of the optical pickup.

A Super-RENS optical disc comprising a super resolution near-field structure formed of a metal oxide or a polymer compound and a phase change layer formed of a GeSbTe or a AgInSbTe based structure for recording of data and reproducing of data is known from WO 2005/081242 and US 2004/0257968. Further examples of super-resolution optical media are described in WO 2004/032123 and by Tominaga et al., Appl. Phys. Lett. Vol. 73, No. 15, 12 Oct. 1998. The super RENS effect allows to increase the resolution of the optical pickup for reading of the marks on an optical disc, but does not allow to reduce the track pitch.

In Marx and Psaltis, "Optical diffraction of focused spots and sub-wavelength structures" Journal of Opt. Soc. Am. A/Vol. 14, No. 6/June 1997, the diffraction behavior of pits of a proposed new digital video disc format is discussed. According to a numerical analysis, the phase depth of the pits of an optical disc depends strongly on the polarization of the incident optical beam. For pit widths between $\lambda/2$ and $\lambda$, where $\lambda$ is the wavelength of the incident light, the phase depth for TM polarized light remains essential constant, but shows a strong dependence on the pit widths for TE polarized light. The results are explained in correspondence with a wave guide model, where for $d<\lambda/2$ only evanescent TE wave can exist and only a TM zero mode can propagate. For the measurement of each polarization TE, TM independently, an optical set up is proposed including a polarizing beam splitter in the return parts and a standard detector array for each polarization component.

BRIEF SUMMARY OF THE INVENTION

The optical storage medium according to the invention comprises tracks with a mark/space data structure, wherein the tracks comprise alternately partitioned marks and not partitioned marks. The partitioned marks are partitioned in particular in tracking direction and are partitioned in two parts, advantageously in two equal parts. The partitions are arranged in a preferred embodiment such that one track comprises not partitioned marks and a neighboring track comprises partitioned marks, for reducing the track pitch of the optical storage medium and for providing an increased data capacity.

The optical storage medium is in a preferred embodiment an optical disc, and the data structure of the optical disc comprises two spirals which have either tracks with partitioned marks or tracks with not partitioned marks, and in which the partitioned marks are partitioned in radial direction.

In a further aspect of the invention, the optical storage medium is an optical disc comprising a mask layer with a phase change material for providing a super resolution near field effect (Super-RENS). A Super-RENS storage medium with such a track structure allows to reduce the track pitch for a read-only storage medium for example to a value of about 200 nm, when a laser with a wavelength of 405 nm is used. This allows to increase the data density in tracking direction by a factor of about 1.6 with regard to a Blu-Ray disc. For reading the data of the Super-RENS storage medium, a polarized laser beam has to be used comprising both TE and TM polarization components, because the phase depth of the pits of the storage medium depends on the polarization of the incident light. There is no dependency on the width of the pits for the TM polarization component, but for the TE polarization component.

An apparatus for reading the data of a respective optical storage medium comprises a pickup unit with a laser and a first optical element for providing a TM polarized beam and a TE polarized beam, a second optical element, for example a polarizing beam splitter, for separating the reflected TM and TE polarized beams, and a first and a second detector. The TM polarized beam is guided to the first detector for providing a data signal and the TE polarized beam is guided to the second detector for providing a tracking signal.

BRIEF DESCRIPTION OF THE DRAWINGS

Preferred embodiments of the invention are explained in more detail below by way of example with reference to schematic drawings, which show.

DETAILED DESCRIPTION OF PREFERRED EMBODIMENTS

Figure 1A:
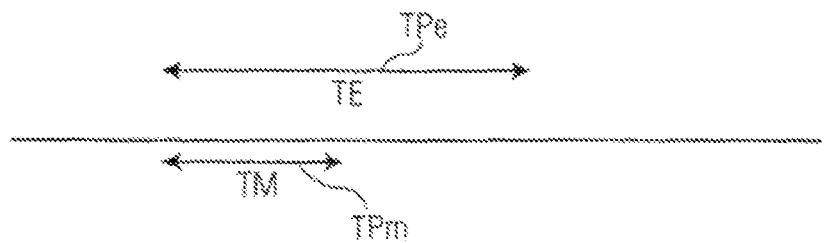
FIG. 1a a track structure of an optical storage medium with an embossed pit structure in a simplified cross section, FIG. 1b a part of the track structure of the optical storage medium of FIG. 1a in a top view, FIG. 2 an optical pickup for reading data from the optical storage medium of FIGS. 1a and 1b.

FIG. 1a shows in a cross section a part of an embossed pit structure of an optical storage medium 1 comprising pits P arranged in tracks T1-T4. The optical storage medium 1 is in particular an optical ROM disc. The pit structure is made for example by means of a stamper on a substrate layer S in a known manner and comprises a reflective coating, for example an aluminum coating, or a super resolution near-field structure (Super-RENS) layer stack, for providing a high reflectivity for incident laser light of an optical pickup of a corresponding apparatus for reading the digital data.

Figure 1B:
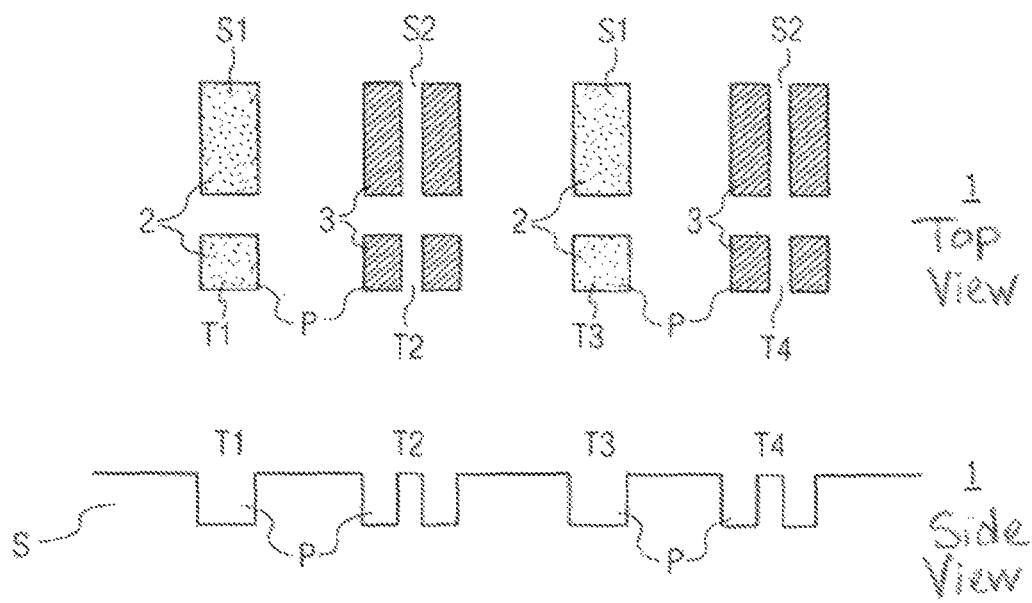

In FIG. 1b a small part of the optical storage medium 1 of FIG. 1a is shown in a top view. The pits P are arranged along tracks T1-T4 on the storage medium 1 and represent a mark/space data structure corresponding with digitally coded data.

According to the invention, the tracks comprise alternatingly partitioned marks and not partitioned marks in tracking direction, which is the radial direction for an optical disc. The tracking direction can be understood also as the cross-track direction. As shown in FIGS. 1a, 1b, the first track T1 comprises not partitioned marks 2 and the neighboring second track T2 comprises partitioned marks 3. The further tracks T3, T4 are arranged in tracking direction and comprise alternatingly also not partitioned marks 2 and partitioned marks 3. In a preferred embodiment of an optical ROM disc, the tracks T1-T4 correspond with two spirals S1, S2, wherein for the first spiral S1 only not partitioned marks 2 are used and for the second spiral S2 partitioned marks 3 are used. The spiral S1 with the not partitioned marks 2 corresponds for example in principle with the mark/space data structure of known optical ROM discs, in which also the pits are arranged in a spiral.

The pits P respectively marks 2 of the track T1 are not partitioned and have different length in accordance with coded digital data. The marks of the track T2 are partitioned in two parts in tracking direction and each of the two parts of a mark 3 has in particular the same length along the track. The partitioned marks 3 are partitioned advantageously in two equal parts. The marks 3 of the track T2 have also different length in accordance with coded digital data, in correspondence with the coding scheme for the marks of the track T1.

An optical disc in accordance with the optical storage medium 1 as described with regard to FIGS. 1a, 1b comprises in particular a mask layer providing a super resolution near field effect (Super-RENS) for increasing the data density with regard to a Blu-Ray disc. Because with a Super-RENS effect only the pit length, respectively mark length, along the track direction, but not in radial direction can be reduced, the data density can be increased only in one dimension by using the Super-RENS effect. According to the present invention, the data density can be increased also in radial direction, by utilizing the different reflectivity factors for the TE polarization component and the TM polarization component of the incident light.

If the incident laser light of a corresponding pickup unit has the polarization direction TM, corresponding with the magnetic field vector pointing in the radial, tracking direction, and the electric field vector pointing in the tangential direction along the track, there is only a small difference in the reflected light between the pits of the track T1 and the partitioned pits of the track T2, because according to this polarization the light penetrates into the holes and is reflected at the bottom of the pits P. The pits P of the track T1 have for example a width in radial direction in the range of about 100 nm, and the width of the partitioned marks P of the track T2 is correspondingly smaller, when a pickup unit comprising a blue laser is used for reading of the data.

If the incident laser light has the polarization direction TE, for which the electric field vector points into radial direction, perpendicular to the tangential track direction, the effective phase depth for the pit structure of the track T2 is very different with regard to the pit structure of the track T1, because this polarization direction cannot penetrate into the pits of track T2 and therefore no light is reflected from the bottom of these pits. The pit depth of the pits P is advantageously between lambda/8 and lambda/4, which provides both a good HF data and a sufficient push-pull signal for the tracking control of a corresponding optical pickup unit.

For the TE polarization component of the incident laser light therefore adjacent tracks T1, T2 look different and essentially only the pits of the tracks T1 and T3 contribute to a tracking signal, when the TE polarization component is used for tracking control, because the pits of the track T2 do not provide a relevant signal contribution to the reflected TE polarized light. Hence, even when the track width between adjacent tracks T1, T2 is reduced by a factor of 2, in comparison with a Blu-Ray disc, still a push-pull signal can be seen.

It is therefore possible in principle to reduce the effective track pitch between tacks T1, T2 to about 160 nm, in comparison with a track pitch of 320 nm of a Blu-Ray disc, when using a Blu-Ray pickup unit with a wavelength of about 405 nm. The effective track pitch TPe for the TE polarization component is therefore by a factor of two larger with regard to the track pitch TPm for the TM polarization component, as indicated in FIG. 1a. Therefore, a track pitch of 400 nm for the TE polarization component can be resolved easily by a pickup unit having a numerical aperture similar to a Blu-Ray pickup.

Figure 2:
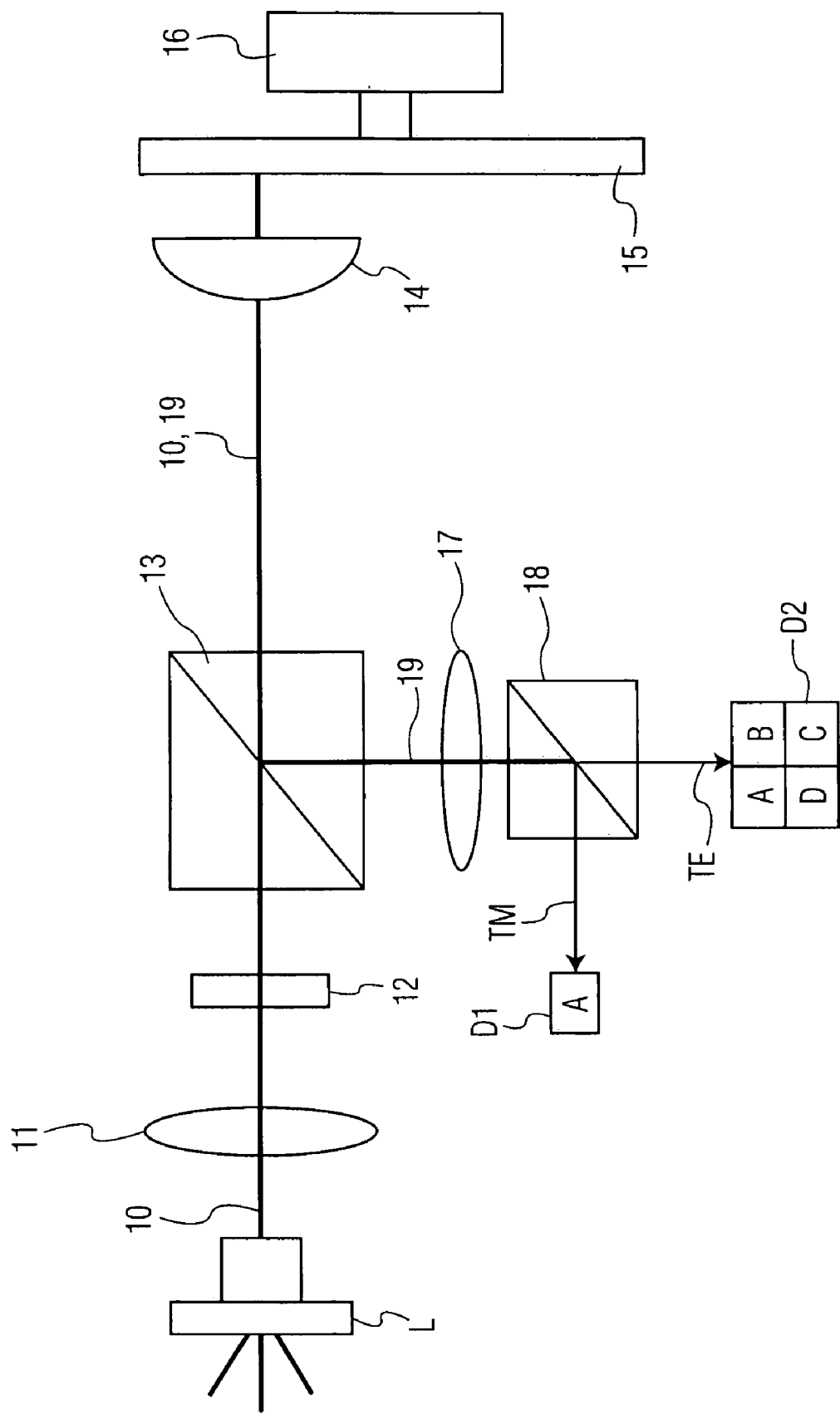

An apparatus for reading digital data from an optical storage medium as explained in FIGS. 1a and 1b is shown in FIG. 2. The apparatus comprises a motor 16 with a turntable, on which an optical disc 15 is placed, and a pickup unit with a laser L. The laser L generates a light beam 10, which is collimated by a collimator lens 11 in the direction of an objective lens 14, which provides a beam spot with a very small focus and a high beam intensity on the disc 15.

The apparatus comprises further a tracking and focusing mechanism, not shown, which moves the pickup unit or the objective lens 14 across the rotating disc 15 for reading of the coded data. This mechanism, which can be a conventional actuator or a swing arm, performs in particular a tracking movement and a focus movement for keeping the beam spot of the laser L onto one of the tracks of the optical disc 15, for reading the data as contained in a specific track.

The laser L is for example a blue laser diode providing a wavelength of about 405 nm, and the mechanism comprises mechanical and electrical means, not shown, as known for example from a Blu-Ray disc recorder or reader. Also further means of the apparatus, which are not relevant for the present invention, are omitted for the sake of simplicity, for example the servo system for the motor 16 and signal processing means for obtaining the digital data from the output voltage signal of the pickup unit.

The pickup unit comprises further a first optical element 12 for providing a beam with a TE polarization and a beam with a TM polarization for the illumination of the disc 15. The optical element 12 is for example a half-wave plate, by means of which the intensity of the TE and TM polarized components can be adjusted. The optical element 12 is arranged in the beam 10 between the laser L and a non-polarizing beam-splitter 13, which is arranged such that the beam 10 coming form the laser L passes through the beam-splitter 13 essentially unaffected, and the reflected beam 19 coming from the disc 15 is directed to a detection unit, without changing the polarization of the beams 10 and 19.

The detection unit of the pickup unit comprises a second optical element 18 for separating the TM and TE polarization components, as reflected from the disc 15, a first detector D1 and a second detector D2. The second optical element 18 is for example a polarizing beam-splitter, which reflects the TM polarization component under an angle of 90° into the direction of the first detector D1, and which is arranged such that the TE polarization component passes through the polarizing beam-splitter 18 essentially unaffected onto the second detector D2. The detection unit comprises advantageously further a focus lens 17 ahead of the second optical element 18, in particular an astigmatic focus lens, for focusing the reflected beam 19 onto the detectors D1, D2.

The TM polarization component as detected by detector D1 contains the digital data signal of the disc 15, and the TE polarization component received by the detector D2 is used for providing a push-pull tracking signal, as explained before with regard to FIGS. 1*a*, 1*b*. The detector D2 is for example a four-segment detector with segments A-D, as known.

The partitioned marks 3, as shown in FIGS. 1*a*, 1*b*, are dimensioned in particular such that they interact preferably with the TM polarized beam of the pickup unit, but not with the TE polarized beam, and the not partitioned marks 2 are dimensioned such that they interact preferably with the TE polarized beam or with the TM polarized beam and the TE polarized beam the pickup unit. The detector D2 can be used also, in a further aspect of the invention, for providing a tracking signal and a data signal. When such a pickup unit is used for reading the data of the track T3 comprising not partitioned marks 2, the TE polarized beam as received by detector D2 does not see the neighboring partitioned marks 3 of tracks T2 and T4 and therefore no crosstalk from tracks T2, T4 is included in the data signal of the reflected TE polarized beam of the track T3.

When the pickup unit reads the data of the track T2 comprising partitioned marks 3, the TE polarized beam sees only the neighboring not partitioned marks 2 of tracks T1 and T3 providing a crosstalk signal. The TM polarized beam as received by detector D1 sees the data signal of the track T2 and the crosstalk of the tracks T1 and T3. Therefore, by subtracting the crosstalk signal received by detector D2 from the signal of the detector D1 yields a data signal essentially free of crosstalk. Hence, the track pitch of tracks T1-T4 of the storage medium 1 can be reduced when using such a pickup unit, even without requiring a mask layer for providing a super resolution near field effect for the storage medium 1.

The invention is applicable also not only for ROM storage media comprising a pit/land structure, as described with regard to FIGS. 1*a*, 1*b*, but can be used also for writable or re-writable storage media comprising for example a data layer with a phase change material. The expression "marks" is therefore used in this specification and the claims for describing tracks with a pit/land data structure as well as for describing tracks with a mark/space data structure.

Figure 3:
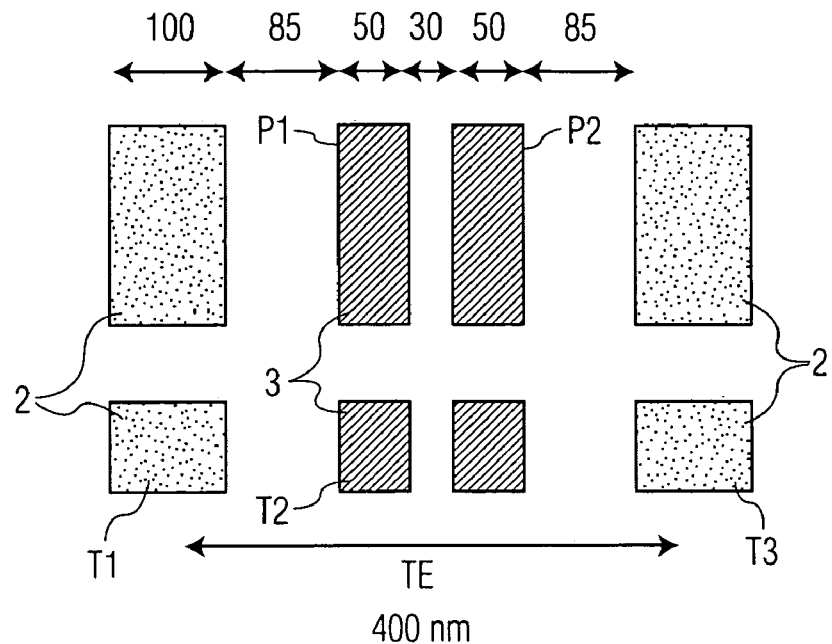
FIG. 3 a track-pitch layout of a preferred embodiment for the track structure of the optical storage medium of FIGS. 1a, 1b, FIGS. 4a, 4b further embodiments of an optical storage medium with a track, in which the marks change between partitioned marks and not partitioned marks at defined positions, and FIGS. 5a, 5b a track structure and a tracking signal for explaining the tracking regulation for respective tracks.

An example for the layout of tracks of an optical disc as explained with regard to FIGS. 1*a*, 1*b* is shown in FIG. 3. A first track T1 comprises not partitioned marks 2, respectively pits, having a width of 100 nm. A second, neighboring track T2 comprises partitioned marks 3, consisting each of two equal parts P1, P2 having each a width of 50 nm, and which are separated by 30 nm. The tracks T1 and T2 are separated by 85 nm.

The next track T3 corresponds with the first track T1 having again not partitioned marks 2, which track is also separated from the neighboring track T2 by 85 nm. The resulting track pitch TPe for such a mark/space data structure as seen by the TE polarization component is therefore TPe=400 nm, which can be easily resolved by a pickup unit as described before with regard to FIG. 2, when using a laser with a wavelength of 405 nm.

An apparatus for reading data from an optical disk with a track structure as described in FIG. 3 comprises for example a pickup unit with an objective lens and a numerical aperture in correspondence with a Blu-Ray pickup. As known, for a Blu-Ray pickup the minimum track pitch which can be resolved is about 280 nm, and the standard track pitch of a Blu-Ray disc is 320 nm, to provide a safety margin. The reason for this resolution limitation is, that for a push pull signal the $0^{th}$ order and the $1^{st}$ order beams have to be collected by the objective lens of the pickup for generating an interference signal on the detector segments responsible for the tracking signal. A track pitch of 400 nm for the TE polarization component can be resolved therefore easily by a pickup unit having a numerical aperture in correspondence with a Blu-Ray pickup.

The TM polarization component sees a track pitch of only 200 nm for the track structure of the optical disc of FIG. 3, because for reading the data of the tracks T1, T2 a Super-RENS near field effect is utilized, which does not depend on the numerical aperture of the objective lens, and because the TM polarization component is sensitive both to the partitioned marks 2 and to the not partitioned marks 3, as explained before. Even though the track pitch of the optical disc as shown in FIG. 3 is increased from 320 nm to 400 nm with regard to the Blu-Ray disc, there is still a factor of 2×320/400=1.6 increase of the radial data density with regard to the Blu-Ray disc.

A pit structure utilizing the dimensions as defined for the tracks T1, T2 shown in FIG. 3 is more complicated to manufacture with regard to not partitioned marks, but it is already compatible with current mastering technology. Alternatively, the shortest marks of the track T2 can be made as not partitioned, solid marks because the smallest partitioned marks are the most complicated for mastering. A few not-partitioned marks within a track T2 of predominantly partitioned marks would not have a negative influence for the tracking control of the pickup unit, when reading the data of the tracks T1, T2.

Figure 4A:
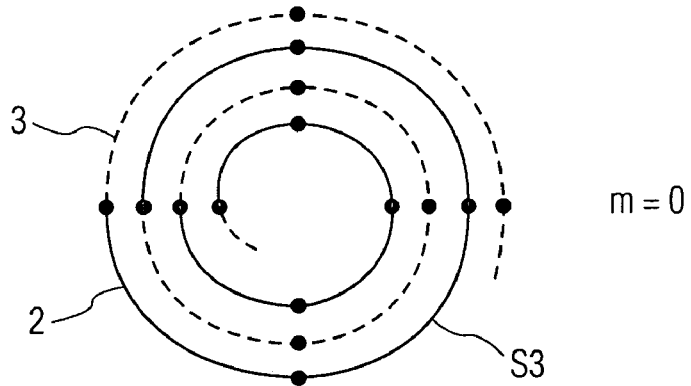
Figure 4B:
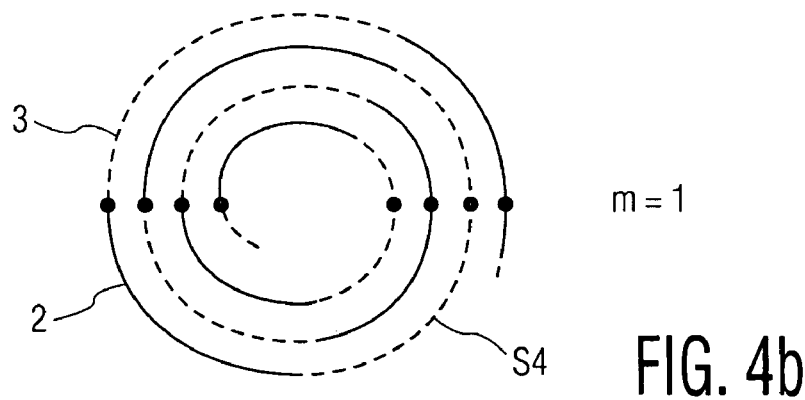

The data structure for a storage disc as explained with regard to FIG. 3 may consist of two spirals S1, S2, as explained with regard to FIGS. 1a, 1b, wherein the spiral S1 comprises only not partitioned marks 2 and the spiral S2 comprises only partitioned marks 3. In an alternative embodiment, a single spiral may be used as shown in FIGS. 4a and 4b. The optical disc 1 as shown in FIG. 4a comprises one spiral S3 which changes always after 360° from partitioned marks 3 to not partitioned marks 2 and vice versa. Alternatively, the partitioning between partitioned and not partitioned marks 2, 3 of a spiral S4 may change after 120°, as shown in FIG. 4b, or according to the rule 360°/(2n+1), where n=1, 2, 3, . . . . Then it is also guaranteed that a neighboring track has always a different structure with regard to partitioning.

Figure 5A:
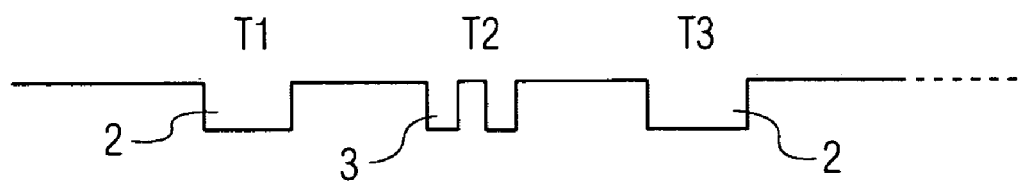
Figure 5B:
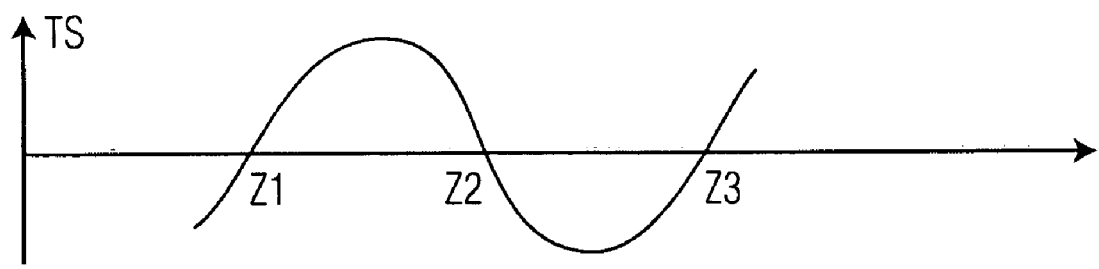

When reading the data of a storage disc 1 as shown in FIGS. 4a and 4b, the position has to be known for the tracking regulation, when the spiral changes from partitioned marks and not partitioned marks and vice versa, but this would not provide any special difficulty. As explained with regard to FIGS. 1a, 1b, the TE polarized beam sees only the not partitioned marks 2 of the tracks T1, T3, . . . . For tracks T1, T3 with not partitioned marks 2 as shown in FIG. 5a a tracking regulation signal TS as shown in FIG. 5b would result. When reading the data of the tracks T1 and T3, the zero crossings Z1 and Z3 have to be used respectively for the tracking of the tracks T1 and T3. For reading the data of the track T2, the zero crossing Z2 has to be used. When the marks change from partitioned marks to not partitioned marks as described with regard to FIGS. 4a, 4b, then the tracking regulation signal TS is inverted. Therefore, only the sign of the signal TS has to be inverted for keeping the pickup unit on the same track.

Also other embodiments of the invention can be made by a person skilled in the art without departing from the spirit and scope of the invention. The invention is in particular not limited for a use with a pickup unit comprising a Blu-Ray disc type pickup, and is also not only applicable for Super-RENS optical storage media, but can be used also for other optical storage media providing a high data density in tracking direction. The invention may be used also for optical storage media comprising concentric tracks, as known from hard disks used in magnetic hard disk drives. The invention resides therefore in the claims herein after appended.

The invention claimed is:

1. Optical storage medium, comprising:
  a plurality of tracks with a mark/space data structure, wherein:
  alternatingly one track comprises not partitioned marks and an adjacent track comprises partitioned marks split into two independent sections that do not share a physical border, the partitioned and not partitioned marks having different lengths in accordance with coded digital data, the partitioned marks interact with a TM polarized beam but not a TE polarized beam, and the non-partitioned marks interact with a TE polarized beam or a TM polarized beam; and
  the partitioned marks are partitioned in tracking direction for providing tracking information, such that a first track comprises only partitioned marks, an adjacent second track comprises only not partitioned marks, an adjacent third track comprises only partitioned marks, and an adjacent fourth track comprises only not partitioned marks.

2. The optical storage medium of claim 1, wherein the partitioned marks are partitioned in at least two equal parts having the same length in track direction with a land section in between.

3. The optical storage medium of claim 1, wherein the optical storage medium is a read-only optical disc which comprises a super resolution near field structure, and the track pitch between adjacent tracks is below 250 nm.

4. The optical storage medium of claim 3, wherein the data structure of the optical disc comprises two spirals which have either partitioned marks or not partitioned marks, or comprises one spiral which has alternatively partitioned marks and not partitioned marks.

5. The optical storage medium of claim 3, wherein the super resolution near field structure has the function of a mask layer for providing a super resolution near field effect.

6. The optical storage medium of claim 3, wherein the partitioned marks and the not partitioned marks have a read-only positive or negative pit structure with a pit depth between lambda/8 and lambda/4, and wherein the partitioned marks are partitioned in radial direction.

7. The optical storage medium of claim 1, wherein the track pitch between two adjacent tracks is below an optical resolution limit of an optical pickup for reading data of the optical storage medium.

8. Optical storage medium, comprising:
  a plurality of tracks with a mark/space data structure, wherein:
  alternatingly one track comprises not partitioned marks and an adjacent track comprises partitioned marks, the partitioned and not partitioned marks having different lengths in accordance with coded digital data,
  the partitioned marks are partitioned in tracking direction for providing tracking information, such that a first track comprises partitioned marks, an adjacent second track comprises not partitioned marks, an adjacent third track comprises partitioned marks and an adjacent fourth track comprises not partitioned marks, and
  the shortest marks of the tracks having partitioned marks are solid marks without partitioning.

9. The optical storage medium of claim 8, wherein the track pitch between two adjacent tracks is below an optical resolution limit of an optical pickup for reading data of the optical storage medium.

10. The optical storage medium of claim 9, wherein the optical storage medium is a read-only optical disc comprising a super resolution near field structure, and the track pitch between adjacent tracks is below 250 nm.

* * * * *